United States Patent [19]

Hess et al.

[11] Patent Number: 4,495,722
[45] Date of Patent: Jan. 29, 1985

[54] DEEP WATER FISHING LURE

[76] Inventors: Dean Hess; Karen Hess, both of 3879 Modesto St., Castro Valley, Calif. 94546

[21] Appl. No.: 465,441

[22] Filed: Feb. 10, 1983

[51] Int. Cl.³ .............................................. A01K 85/00
[52] U.S. Cl. .................................. 43/42.39; 43/42.47
[58] Field of Search ................. 43/42.26, 42.28, 42.39, 43/42.45, 42.46, 42.47, 42.48

[56] References Cited

U.S. PATENT DOCUMENTS

| D. 149,238 | 4/1948 | Vaars | 43/42.45 |
|---|---|---|---|
| D. 202,112 | 8/1965 | Storm | 43/42.45 |
| 252,628 | 1/1882 | Smith | 43/42.45 |
| 1,950,075 | 3/1934 | Akerson | 43/46 |
| 2,097,986 | 11/1937 | McEwen | 43/42.47 |
| 2,598,360 | 5/1952 | Cummins | 43/42.08 |
| 2,938,293 | 5/1960 | Richardson | 43/42.48 |
| 3,104,486 | 9/1963 | Gressard | 43/42.28 |
| 3,139,693 | 7/1964 | Newman | 43/42.39 |
| 3,141,255 | 7/1964 | Randall | 43/42.11 |
| 3,683,543 | 8/1972 | Santosuosso | 43/42.39 |
| 3,716,937 | 2/1973 | Santosuosso | 43/42.47 |
| 4,164,826 | 8/1979 | Metzler et al. | 43/42.05 |

Primary Examiner—Gene P. Crosby
Assistant Examiner—Marc Hodak
Attorney, Agent, or Firm—Francis H. Lewis

[57] ABSTRACT

A fishing lure especially suited for deep-water fishing has a heavy body, fabricated from lead, and shaped and painted to resemble a small bait fish. The fishing line is attached to a small eyelet affixed to the top of the body directly over the center of gravity. A second eyelet in the tail of the body is threaded to the attachment ring on a double fishing hook, such that the prongs of the hook extend upward. A skirt is fastened around the shank of the hook, thereby providing attractive movement as well as camouflage for the hook. A thin metal disk projects downward from the body, directly below the center of gravity and lying in a vertical plane along the longitudinal axis, forming an approximately semicircular fin. A small hole is located in the lower portion of the disk, to which a second line may be attached to suspend a second lure in a similar manner, and to thereby allow several lures to be strung together serially and used from the same line.

6 Claims, 5 Drawing Figures

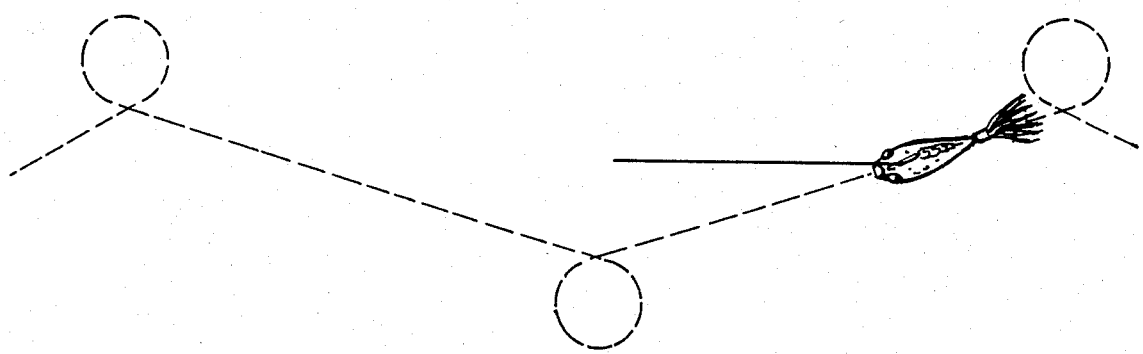
Fig. 3
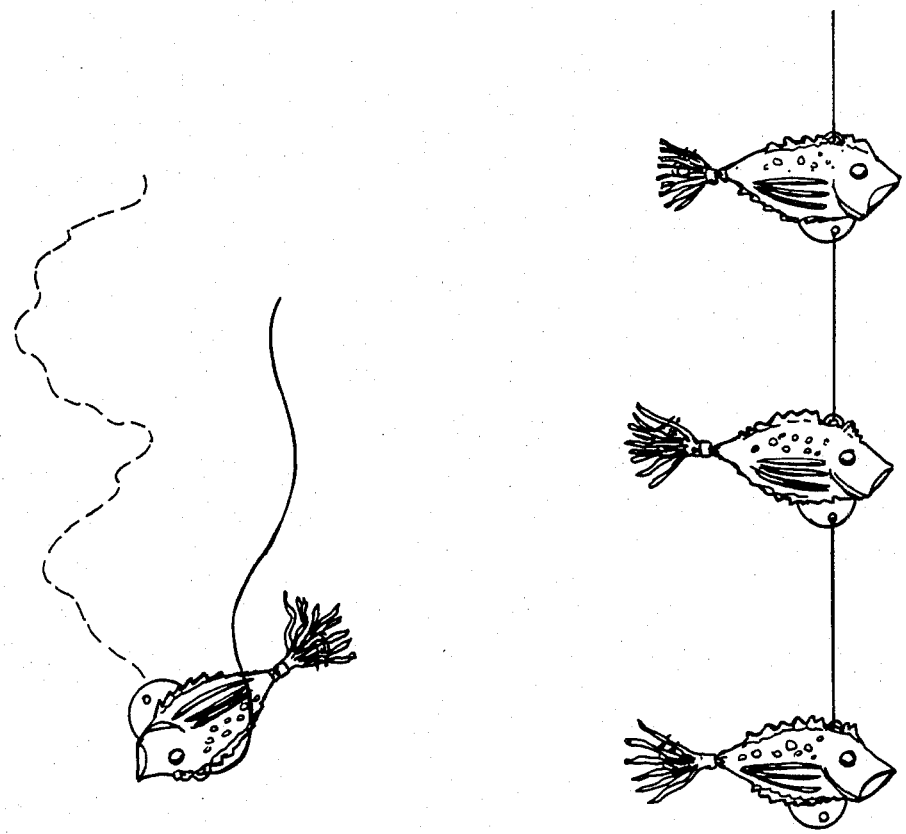
Fig. 4
Fig. 5

DEEP WATER FISHING LURE

BACKGROUND OF THE INVENTION

1. Field of the Invention

This invention pertains generally to the field of fishing lures and artificial bait, and more particularly to the field of lures particularly suited for ocean fishing and for catching bottom fish in deep water.

2. Description of the Prior Art

Although the design of fishing lures is generally more of an art than a science, there are two distinct methods which have been used commonly for designing lures. One method is to give the lure an appearance resembling a smaller fish, fly, or other bait which will attract the fish. The other technique is to design a lure which will move erratically through the water so that it imitates the motion of live bait.

The design of deep-water fishing lures (in excess of 200 feet depth) presents a special problem in that the lure must be heavily weighted in order to remain near the bottom despite the action of heavy currents and tides. The weight of the lure tends to dampen its motion in the water, and makes it more difficult to produce the erratic movement that is desired. A second problem with deep-water lures is that it is difficult for the fisherman to recognize when the hook has grappled or become tangled in the line, since the lure is so deep. A lure which is designed to undergo erratic motion through the water is more likely to grapple, and conversely a lure which is constructed to prevent grappling will tend to move along a regular trajectory.

Many lures have been designed to imitate a small fish and to move erratically through the water when the line is trolled, casted or jigged. Lures having fins, skirts, and eccentrically weighted bodies have been used to produce this irregular movement. Such lures have been designed only for fishing relatively near the surface or in shallow water, and are generally unsuited for deep-water fishing.

A conventional method for deep-water fishing is to use a heavy "cannon-ball" type of sinker, with bait and hooks located upwardly along the line. This method is severely limited in the degree of irregularity which can be imparted to the motion of the bait. Weighted lures have also been used for deep-water fishing, but they generally suffer from the same drawback.

One particular jig which is designed for deep-water salmon fishing is disclosed in U.S. Pat. No. 4,164,826 (Metzler). This jig is comprised of an elongated plate-like tapered lead body with a transverse bend, having an oblique end face. The line passes through the jig longitudinally, and is fastened to the hook at the narrow end of the jig. The jig is designed to undergo a wobbling rotational motion about the axis of the line when it is drawn through the water. However when the line is jigged, or raised up and down, this device will generally sink with the hook upwardly disposed and will therefore tend to grapple and tangle the line.

Accordingly, it is desirable to provide a fishing lure which is heavily weighted for deep-water fishing, and which will undergo a variety of erratic movements when it is trolled or jigged. It is also desirable to provide a lure which resembles a small bait fish, and which will not grapple. It is further desirable to provide a lure which is rugged and durable, and inexpensive to construct. In addition, it is desirable to provide a lure which may be strung in series with other similar lures along a fishing line.

SUMMARY OF THE INVENTION

The improved fishing lure disclosed herein includes a heavy lead body shaped and painted to resemble a small bait fish. The line is attached to a small ring located at the top of the body directly above the center of gravity of the lure. An aluminum disk is partially embedded in the lower portion of the body below the center of gravity, aligned along the longitudinal axis of the body in a vertical plane, and projecting below the body to form a vertical fin. A small hole is located in the lower portion of this fin, to which a second line may be attached to allow a plurality of these lures to be strung together serially. A second small ring is fastened to the tail of the "bait fish" body. This ring is flexibly attached to a double hook with an orientation such that the prongs project upward when the hook extends away from the body. A vinyl or rubber skirt enshrouds the double hook to provide camouflage, and create further movement which will attract fish.

It is an object of this invention to provide a fishing lure which is sufficiently heavy for deep-water fishing, and which will undergo erratic motion when it is trolled or jigged.

A second object of this invention is to provide a lure which resembles a small bait fish.

Another object of this invention is to provide a lure which will not grapple or tangle the line when the lure is trolled or jigged.

Yet another object of this invention is to provide a lure which may be serially fastened to similar lures along the line.

A further object of this invention is to provide a lure which is rugged, durable, inexpensive and simple in construction.

These and other objects, advantages, characteristics and features of this invention may be better understood by examining the following drawings together with the detailed description of the preferred embodiment.

BRIEF DESCRIPTION OF THE DRAWINGS

FIG. 3 is a plan view of the lure in use, showing its trajectory during trolling.

FIG. 4 is an elevational view of the lure in use, showing its trajectory during jigging when the lure is descending.

FIG. 5 is an elevational view of several of the lures in use, serially attached to the line.

DETAILED DESCRIPTION OF THE PREFERRED EMBODIMENT

Figure 1:
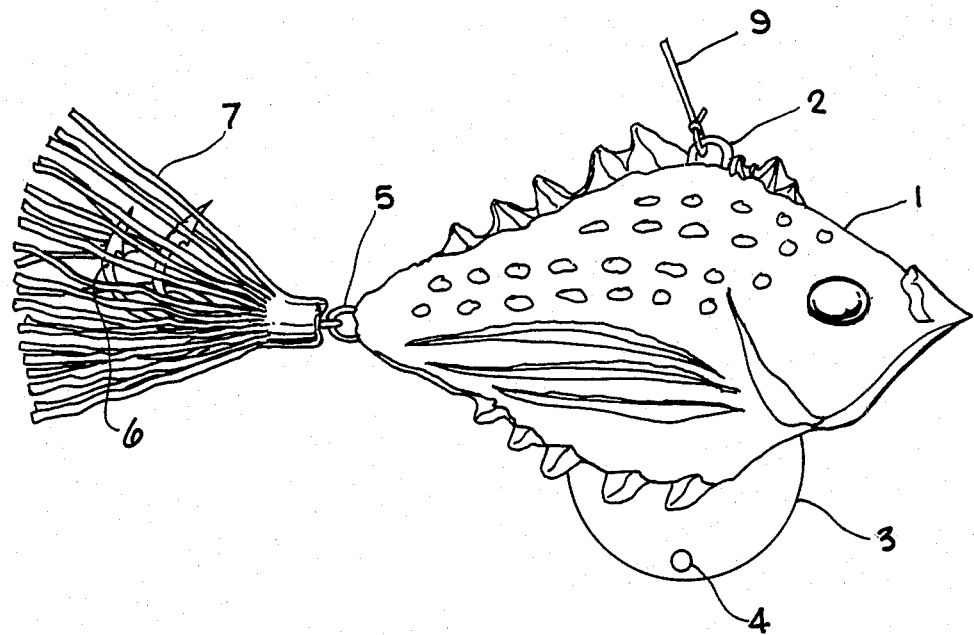
FIG. 1 is a side view of the fishing lure according to the present invention.
Figure 2:
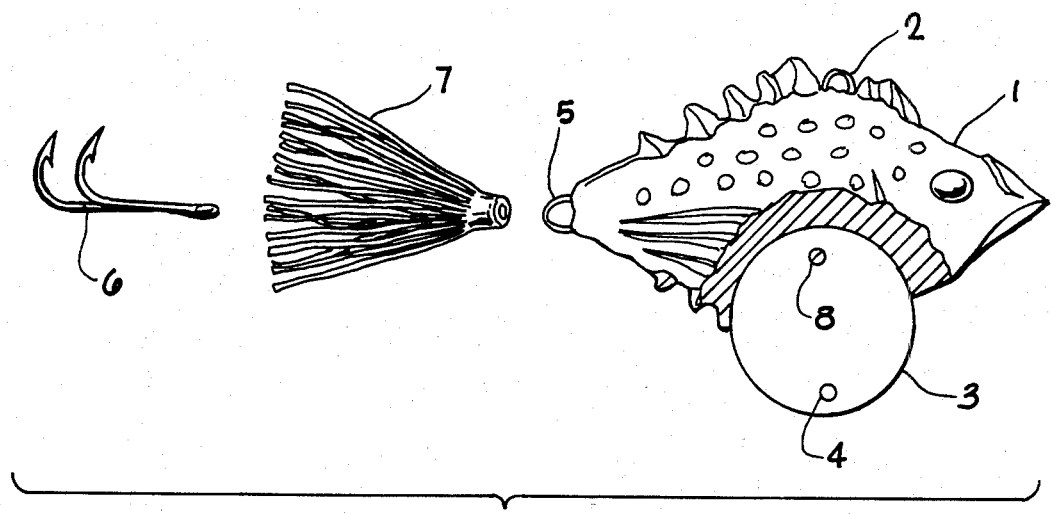
FIG. 2 is a partially sectioned, partially exploded view of the lure shown in FIG. 1, showing the structure of the fin, hook and skirt in relation to the body of the lure.

Referring to the drawings, particularly FIGS. 1 and 2, the body of the lure 1 is formed in the shape of a small bait fish, such as a black rockfish. This body is preferably constructed as a lead casting, weighing approximately one pound, and is painted to bear a realistic resemblance to the bait fish. A small metal ring or eyelet 2 is affixed to the casting at its upper surface directly above the center of gravity, and is attached to the fishing line 9. A second ring or eyelet 5 is affixed to the tail of the casting, oriented to lie in a vertical plane. Both eyelets may be preferably formed of #54 gauge steel wire. The attachment ring of a double fishing hook 6 threads the second eyelet 5, oriented such that the prongs of the hook project upward when the hook extends away from the body. The hook is preferably of size 5/0. A skirt 7 is frictionally attached to and surrounds the shank of the hook adjacent to its attachment ring. The skirt is preferably fabricated of vinyl or rubber, and its strands extend beyond the ends of the hook and are sufficiently numerous and dense to camouflage the prongs.

A thin metal disk 3 is embedded partially in the lower portion of the body, oriented in the vertical plane along the longitudinal axis and located directly below the center of gravity, such that approximately half of the disk projects below the surface of the body, forming a vertical fin. The diameter of the disk is approximately one-third the length of the body. Typically the disk may be fabricated from 1/32 inch thick aluminum sheet metal, and may be approximately one and one-half inches in diameter. A small hole 4, typically ⅛ inch in diameter, is located in the lower portion of the disk, and provides means for attaching a second fishing line to the lure, the opposite end of which is attached to the eyelet of a second lure in a similar manner. Thus, a plurality of lures may be serially strung together as described further hereinbelow.

The disk 3 is attached to the body by inserting it into the mold before casting. A hole 8 is located in the embedded portion of the disk, and may be typically ¼ inch in diameter. This serves to provide structural strength and support to the disk when the casting is poured and metal fills this hole, and then solidifies.

Compared to previous devices the structure disclosed above provides substantially superior performance of the lure when it is trolled or jigged. For example, it is found that when the lure is trolled or used in currents in excess of 2 miles per hour, the lure follows a trajectory similar to that shown in FIG. 3. This trajectory oscillates laterally relative to the current direction over a span of approximately 1 foot. The lure travels approximately 3 feet in an oblique direction relative to the current, then turns completely around and travels approximately 3 feet along the opposite diagonal direction. This motion then repeats. Thus the path of the lure oscillates back and forth across the current path, and the lure spins rapidly at each reversal of the trajectory.

Similarly, this lure undergoes very erratic motion during jigging, i.e. when the line is raised and then allowed to fall. When the lure is freely falling through the water, the fin tends to flip it over and create a highly unstable trajectory, which is illustrated schematically in FIG. 4. It is found that both this jigging performance and that displayed in trolling, described above, are optimized by the placement of the fin directly below the center of gravity of the lure, with the line attached directly above.

It will be further appreciated that the location and orientation of the hook are such that grappling or tangling is avoided. When the lure is jigged and begins to descend, it turns over and causes the hook to project downward, away from the line. During trolling the lure tends to rotate only in the horizontal plane, so that the hook does not encounter the line.

Referring now to FIG. 5, it will be readily seen that a plurality of these lures may be used simultaneously, suspended from the same fishing line and serially attached to each other. The uppermost lure is attached to the line at the upper eyelet. One end of a second line is fastened to the small hole in the lower part of the disk fin on this lure, and the other end is tied to the upper eyelet of a second lure, which is thereby suspended below the first lure. A third lure may be similarly suspended below the second lure, as shown in the drawing. Any number of lures may be used simultaneously in this manner.

From the foregoing description, it will be noted that the lure is rugged, durable, simple and inexpensive in construction. No particularly complex or expensive techniques are required for fabrication of the lure, and its operation does not depend on any moving parts, unlike many previous devices.

It will be further appreciated that various modifications and changes may be made in the above-described fishing lure while preserving the features and advantages set forth, that the foregoing description and drawings are illustrative and not limiting, and that the spirit and scope of the present invention are to be determined by reference to the appended claims.

What is claimed is:

1. A bottom fishing lure, comprising:
    an elongated solid body weighing not substantially less than one pound, said body being fabricated from material having a density approximately equal to that of heavy metal;
    line-attachment means affixed on the upper surface of said body, such that a fishing line may be attached to said body;
    hook means attached to one end of said body; and
    fin means rigidly attached to the lower surface of said body, said fin means forming a foil structure extending below said body along the vertical line passing through the center of gravity of said body when said lure is suspended by said fishing line in water, wherein said foil structure comprises a vertical planar foil parallel to the longitudinal axis of said body, said foil having an edge that is substantially semicircular in shape of diameter approximately one-third the length of said body and being located directly below the center of gravity of said lure, such that when said lure is jigged and descends in the water said fin means tends to cause said lure to invert its orientation by rotating 180 degrees about a horizontal axis.

2. A fishing lure as recited in claim 1, wherein said line-attachment means comprises an eyelet rigidly affixed to said body at a location directly above the center of gravity of said lure when the longitudinal axis of said body is horizontal.

3. A fishing lure as recited in claim 1, wherein said hook means comprises:
    an eyelet affixed to one end of said body; and
    a hook structure having an attachment ring flexibly engaging said eyelet.

4. A fishing lure as recited in claim 3, wherein said eyelet lies in a vertical plane, and wherein said hook structure is oriented on said eyelet such that every prong of said hook structure projects upward when said hook structure is extended away from said body along its central axis.

5. A fishing lure as recited in claim 1, wherein the lower portion of said fin means is perforated with a small hole, whereby a secondary fishing line may be attached to said fin means.

6. A fishing lure as recited in claim 1, wherein said body is formed in such shape and treated with coloring means such that said body has the visual appearance of a fish.

* * * * *